(12) United States Patent
Yosef et al.

(10) Patent No.: US 11,656,977 B2
(45) Date of Patent: May 23, 2023

(54) AUTOMATED CODE CHECKING

(71) Applicant: EMC IP Holding Company LLC, Hopkinton, MA (US)

(72) Inventors: Ilan Yosef, Petach Tiqva (IL); Bella Bekker-Vernik, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/223,751

(22) Filed: Apr. 6, 2021

(65) Prior Publication Data

US 2022/0318129 A1     Oct. 6, 2022

(51) Int. Cl.
    *G06F 11/36*       (2006.01)
    *G06F 8/71*        (2018.01)

(52) U.S. Cl.
    CPC ............ *G06F 11/3688* (2013.01); *G06F 8/71* (2013.01); *G06F 11/3676* (2013.01); *G06F 11/3696* (2013.01)

(58) Field of Classification Search
    CPC .... G06F 8/71; G06F 11/3676; G06F 11/3688; G06F 11/3696
    See application file for complete search history.

(56) References Cited

U.S. PATENT DOCUMENTS

| | | | | |
|---|---|---|---|---|
| 5,495,610 A * | 2/1996 | Shing | ......................... | G06F 8/71 710/21 |
| 8,561,036 B1 * | 10/2013 | Beans | .................... | G06F 11/368 717/124 |
| 9,092,578 B2 * | 7/2015 | Wefers | ................. | G06F 11/3688 |
| 10,430,319 B1 * | 10/2019 | Tokappa | ............. | G06F 11/3692 |
| 10,671,519 B2 * | 6/2020 | Jayaswal | ............. | G06F 11/3676 |
| 10,678,678 B1 * | 6/2020 | Tsoukalas | ............ | G06F 11/3664 |
| 11,281,567 B1 * | 3/2022 | Machalica | ............... | G06N 7/00 |
| 2010/0058294 A1 * | 3/2010 | Best | ..................... | G06F 11/3688 717/122 |
| 2014/0047413 A1 * | 2/2014 | Sheive | .................. | H04L 65/403 717/110 |

(Continued)

OTHER PUBLICATIONS

Regression testing, https://en.wikipedia.org/w/index.php?title=Regression_testing&oldid=1009655346 (last visited Apr. 6, 2021).

(Continued)

*Primary Examiner* — Douglas M Slachta
(74) *Attorney, Agent, or Firm* — Ryan, Mason & Lewis, LLP (57) ABSTRACT

Methods, apparatus, and processor-readable storage media for automated code checking are provided herein. An example method includes identifying at least one test related to code of a repository that is affected by a commit operation; in response to determining that an existing job in a first database includes the at least one test: updating a configuration of the existing job based on the affected code, and executing the existing job with the updated configuration; and in response to determining that an existing job in the first database does not include the at least one test: determining that a previously executed job from a second database includes the at least one test, updating the configuration of the previously executed job based on the affected code to create a new job, adding the new job to the first database, and executing the new job.

20 Claims, 5 Drawing Sheets

(56) References Cited

U.S. PATENT DOCUMENTS

| | | | | |
|---|---|---|---|---|
| 2014/0181590 A1* | 6/2014 | Wefers | ................ | G06F 11/3688 |
| | | | | 714/38.1 |
| 2015/0026664 A1* | 1/2015 | Bartley | .............. | G06F 11/3676 |
| | | | | 717/124 |
| 2015/0293837 A1* | 10/2015 | Rajamanickam | ... | G06F 11/3676 |
| | | | | 717/124 |
| 2016/0034382 A1* | 2/2016 | Kumar | ................ | G06F 11/3676 |
| | | | | 717/124 |
| 2016/0196200 A1* | 7/2016 | Mizobuchi | .......... | G06F 11/3684 |
| | | | | 717/124 |
| 2017/0097882 A1* | 4/2017 | Chakraborty | ....... | G06F 11/3688 |
| 2018/0246803 A1* | 8/2018 | Zhang | ................ | G06F 11/3688 |
| 2018/0260312 A1* | 9/2018 | Strachan | ............. | G06F 11/3684 |
| 2019/0146755 A1* | 5/2019 | Mody | ....................... | G06F 7/76 |
| | | | | 708/200 |
| 2020/0349055 A1* | 11/2020 | Reddy | ................ | G06F 11/3692 |
| 2021/0263728 A1* | 8/2021 | Farrier | .............. | G06Q 10/0635 |
| 2021/0390011 A1* | 12/2021 | Cser | ......................... | G06F 8/70 |
| 2022/0179642 A1* | 6/2022 | Liang | ....................... | G06F 8/71 |

OTHER PUBLICATIONS

Unit testing, https://en.wikipedia.org/w/index.php?title=Unit_testing &oldid=1011894568 (last visited Apr. 6, 2021).

* cited by examiner

AUTOMATED CODE CHECKING

FIELD

The field relates generally to information processing systems, and more particularly to evaluating software code in such systems.

BACKGROUND

Software developers often develop large amounts of source code in parallel on different code branches. In such scenarios, a given developer may make changes to the source code using one or more commit operations in one area of the source code that, unbeknownst to the given developer, causes one or more errors in another area of the source code. Currently, developers and quality assurance engineers manually perform specific unit tests prior to committing changes. The creation of such tests can be time consuming and is usually performed by the developers to test their respective source code changes. However, the tests often fail to cover all of the portions of source code that may be affected by a given commit operation.

SUMMARY

Illustrative embodiments of the disclosure provide techniques for automated code checking. An exemplary computer-implemented method includes identifying at least one test that is related to at least one portion of software code of a code repository that is affected by a commit operation with the code repository; determining whether at least one existing job identified in a first database comprises the at least one test; in response to determining that the at least one existing job identified in the first database comprises the at least one test: (i) updating one or more configuration parameters of the at least one existing job based at least in part on the at least one affected portion of software code, and (ii) executing the at least one existing job with the updated one or more configuration parameters; and in response to determining that the at least one existing job identified in the first database does not comprise the at least one test: (i) determining that a previously executed job identified in a second database comprises the at least one test, (ii) updating one or more configuration parameters of the previously executed job based at least in part on the at least one affected portion of software code to create a new job, (iii) adding the new job to the first database, and (iv) executing the new job.

Illustrative embodiments can provide significant advantages relative to conventional code checking techniques. For example, challenges associated with causing one or more errors in software code when performing commit operations are overcome in one or more embodiments by automatically analyzing the impact of software commit operations and generating comprehensive unit tests based on the analysis.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
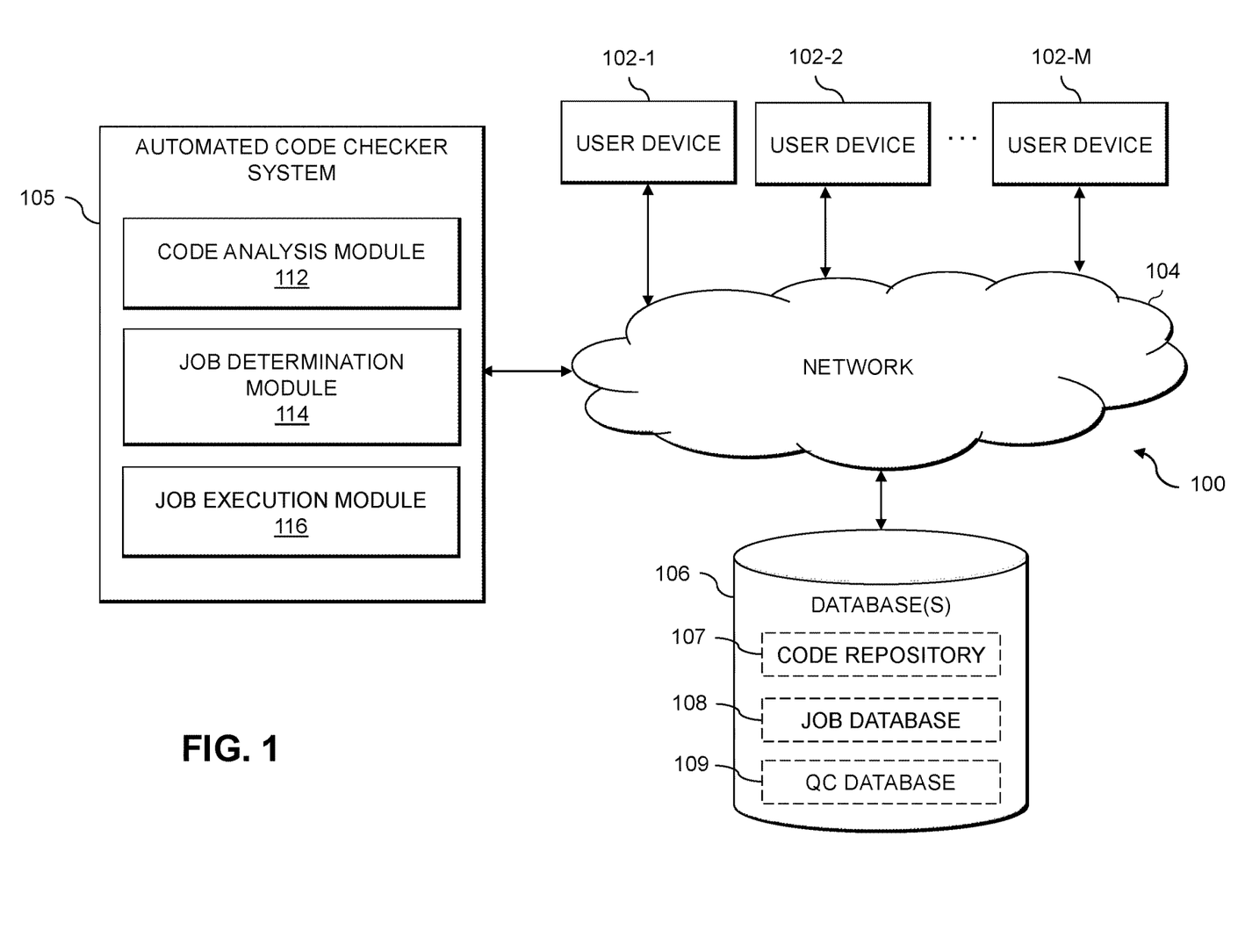
FIG. 1 shows an information processing system configured for automated code checking in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks", but the latter is assumed to be a component of the former in the context of the FIG. 1 embodiment. Also coupled to network 104 is an automated code checker system 105.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated code checker system 105 can have at least one associated database 106 configured to store data pertaining to, for example, software tests and/or results of such tests. In at least one example embodiment, the database(s) 106 may include one or more of: a software code repository 107, a job database 108, and a QC (quality control) database 109. The software code repository 107 may include, in at least some embodiments, source code evaluated by the disclosed techniques for automated code checking. The job database 108 may include one or more jobs having one or more tests that are to be executed to test code in the software code repository. The job database 108 may be implemented as, for example, a MongoDB. The QC database 109 may store historical test results, one or more sets of tests, and configuration parameters pertaining to the one or more sets of tests, for example.

The term "database" as used herein is intended to be broadly construed, so as to encompass, for example, at least a portion of a code repository or a set of code repositories, or other database portions. In addition, references herein to a "first database" and a "second database" are also intended to be broadly construed, and may refer, for example, to different portions of the same database, or to separate and distinct databases.

In this context and elsewhere herein, the term "test" is intended to be broadly construed so as to encompass for example, a process for verifying software code is working as intended. For example, a given test may correspond to, for example, a functional test, unit test, integration test, or build verification test. Additionally, in this context and elsewhere herein the term "job" is intended to be broadly construed so as to encompass a process for executing a set of one or more tests, such as, for example, a suite of tests.

An example database 106, such as depicted in the present embodiment, can be implemented using one or more storage systems associated with the automated code checker system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated code checker system 105 are one or more input-output devices, which illustratively comprise keyboards, displays or other types of input-output devices in any combination. Such input-output devices can be used, for example, to support one or more user interfaces to the automated code checker system 105, as well as to support communication between automated code checker system 105 and other related systems and devices not explicitly shown.

Additionally, the automated code checker system 105 in the FIG. 1 embodiment is assumed to be implemented using at least one processing device. Each such processing device generally comprises at least one processor and an associated memory, and implements one or more functional modules for controlling certain features of the automated code checker system 105.

More particularly, the automated code checker system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated code checker system 105 to communicate over the network 104 with the user devices 102, and illustratively comprises one or more conventional transceivers.

The automated code checker system 105 further comprises a code analysis module 112, a job determination module 114, and a job execution module 116.

It is to be appreciated that this particular arrangement of modules 112, 114 and 116 illustrated in the automated code checker system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of the modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automated code checker system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the automated code checker system 105 and database(s) 106 can be on and/or part of the same processing platform.

An exemplary process utilizing modules 112, 114 and 116 of an example automated code checker system 105 in computer network 100 will be described in more detail with reference to, for example, the flow diagrams of FIGS. 2 and 3.

One example embodiment described herein provides an automated software tool that searches for one or more changes to software code of a code repository resulting from a commit operation with the code repository, analyzes the impact of such code changes, and automatically generates one or more testing regression suites to test the impacted areas of the code repository to avoid collateral damage that can potentially result from the commit operation. For each next run, the tool is configured to identify one or more portions of the code repository that are not currently being tested, and to continuously update the testing regression suites with additional unit tests to account for the commit operation and resulting code changes. With each run, in at least some embodiments, the tool gains additional information and improves the coverage of the code tested.

Figure 2:
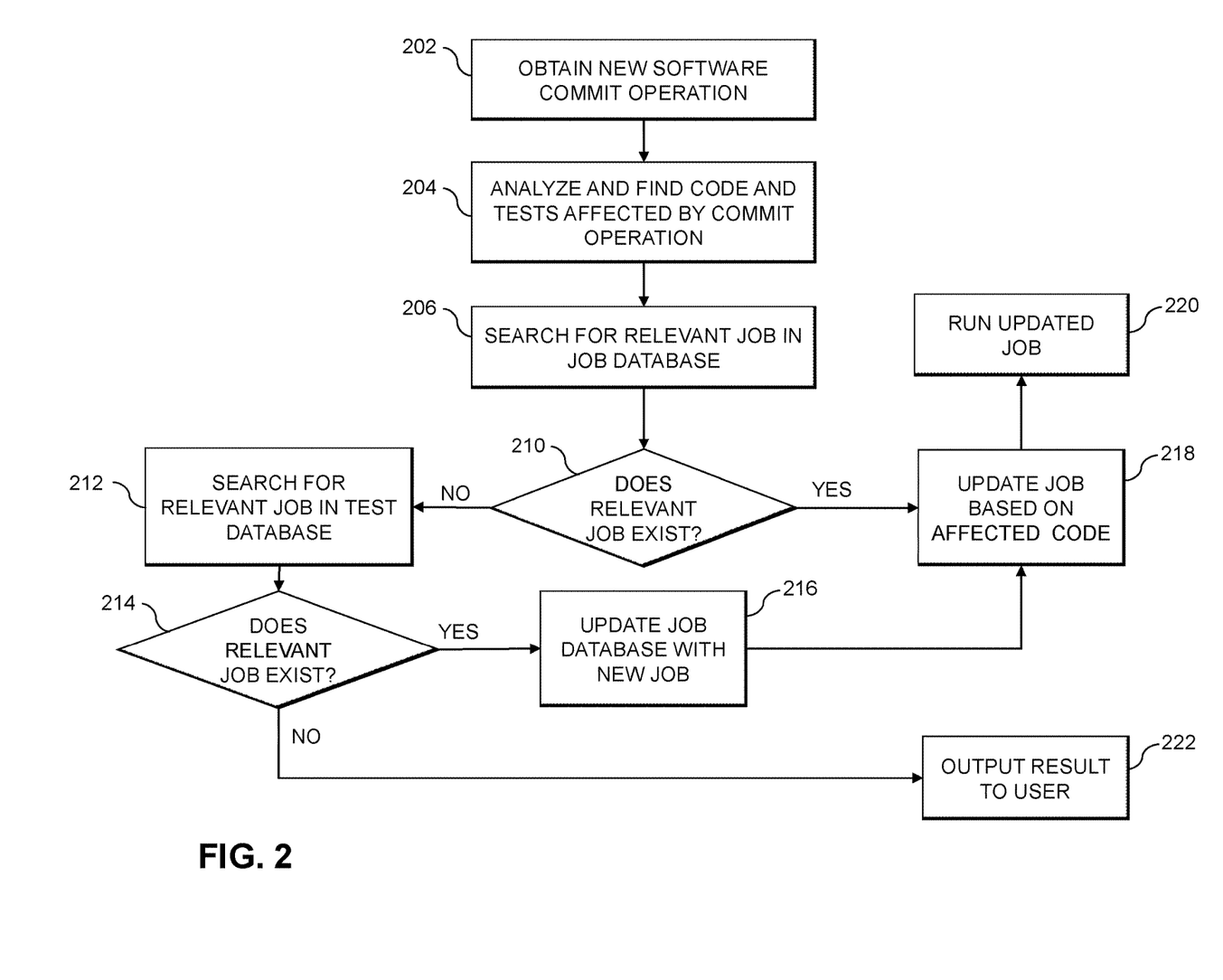
FIG. 2 shows a process flow diagram in an illustrative embodiment.

FIG. 2 is a flow diagram of an automated code checking process in an illustrative embodiment. Step 202 of the automated code checking process includes obtaining a new software commit operation such as, for example, from a developer. Step 204 includes analyzing and finding software code affected by the commit operation. For example, the code can be scanned to find all code changes related to the specific commit operation, as well as areas of the code and functions that were affected by the commit operation. Step 204 also includes identifying a set of tests and any mandatory scripts that are already being used and that are relevant to the areas of code affected by the commit operation. In at least some embodiments, the set of tests may be ranked based on, for example, estimated run times and/or assigned priority levels to the set of tests. A subset of tests may then be selected using the ranked list. For example, if the set of tests includes multiple tests for each of a plurality of features, then a portion of the tests for each feature may be selected for inclusion in the subset.

Step 206 includes searching for a relevant job in a job database that includes the set (or subset) of tests identified in step 204 as well as configuration parameters for the tests. At step 210, it is determined whether a relevant job exists. If yes, then the process continues to step 218, which includes updating the job based on changes to the code affected by the commit operation. Step 220 includes running the updated job.

If a relevant job does not exist in the job database at step 210, then the process continues to step 212, which includes searching for a relevant job in a test database (e.g., a QC database). Step 214 includes determining whether a relevant job exists in the test database. For example, step 214 may include determining whether a new job can be extracted based on the test results of previously executed tests that include the tests identified in step 204. If yes, then the process continues to step 216, which includes updating the job database with the new job. The process continues to step 218, which includes updating the new job in the job database based on the changes to the code affected by the commit operation. Step 220 includes running the updated job.

If a new job cannot be extracted at step 214, then the process continues to step 222, which includes outputting a result to the user. The result may include, for example, an indication that there is no existing job to cover a given portion of the software code and/or that a job needs to be developed for testing the portions of code affected by the commit. As an example, the indication may include information pertaining to the areas of code that are not covered by the job such as, for example, file names, line numbers, function names, and parameters.

In one or more embodiments, the process depicted by FIG. 2 may run automatically after each code commit operation. If, in a specific run one or more specific code changes are missed, and the commit operation results in one or more errors in the code, then the software tool may be updated with a new relevant unit test that covers the affected code areas of the commit operation to avoid collateral damage when the next testing job is executed. By way of example, the commit operation may modify or delete functions which are relied upon by other parts of the source code, and a new unit test may be added to test these other parts of the code. The process can continue with each commit until the tool learns substantially all of the code and software flows are discovered and tested (e.g., a threshold percentage).

Accordingly, as code is developed there are often some gaps that are not tested. The disclosed code checking tool improves over time as it is run by learning about the missing gaps and configuring additional tests for subsequent runs.

Figure 3:
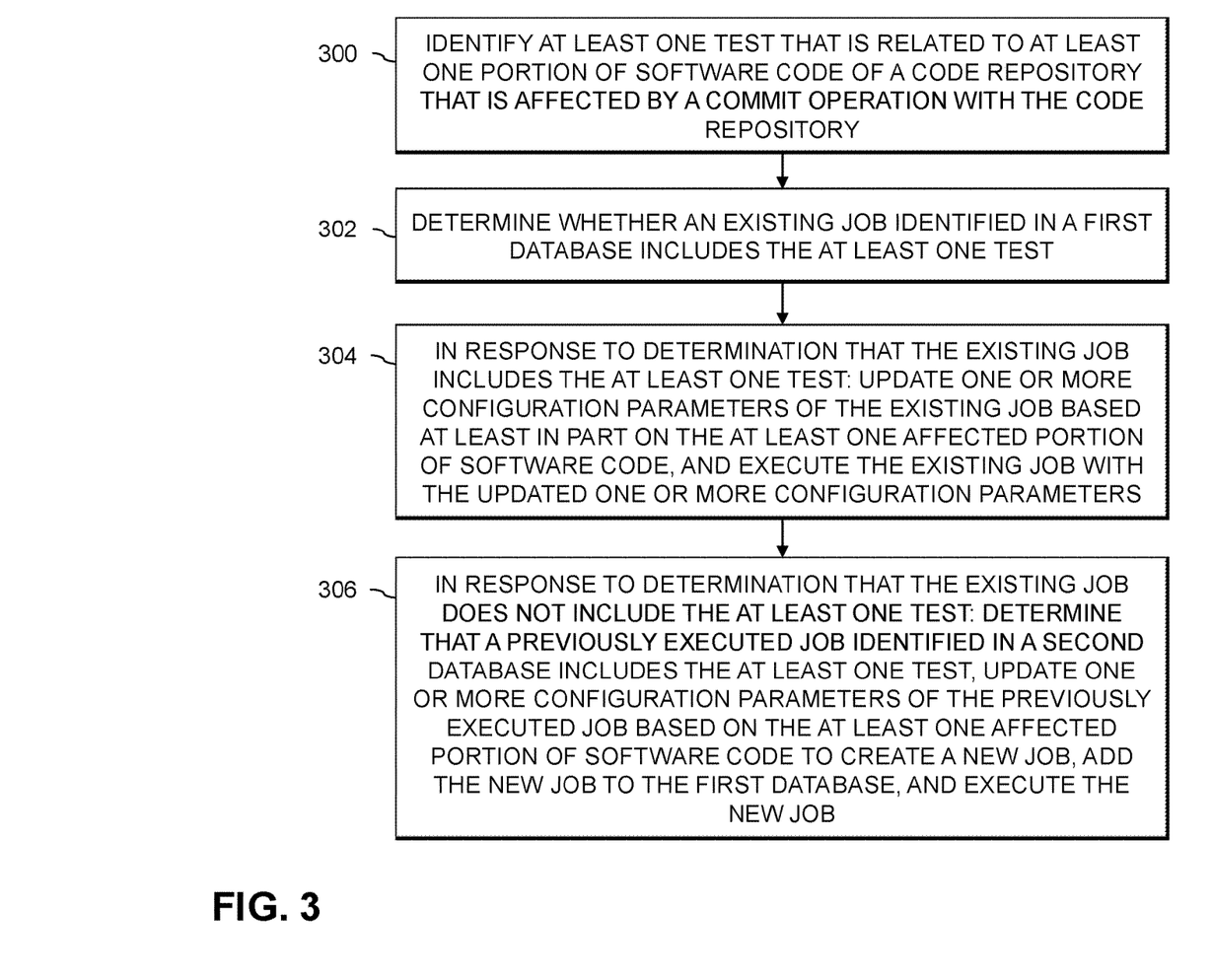
FIG. 3 is a flow diagram of a process for automated code checking in an illustrative embodiment.

FIG. 3 is a flow diagram of a process for automated code checking in an illustrative embodiment. It is to be understood that this particular process is only an example, and additional or alternative processes can be carried out in other embodiments.

In this embodiment, the process includes steps 300 through 306. These steps are assumed to be performed by the automated code checker system 105 utilizing its modules 112, 114 and 116. Step 300 includes identifying at least one test that is related to at least one portion of software code of a code repository that is affected by a commit operation with the code repository. Step 302 includes determining whether at least one existing job identified in a first database comprises the at least one test. Step 304 includes, in response to determining that the at least one existing job identified in the first database comprises the at least one test: (i) updating one or more configuration parameters of the at least one existing job based at least in part on the at least one affected portion of software code, and (ii) executing the at least one existing job with the updated one or more configuration parameters. Step 306 includes, in response to determining that the at least one existing job identified in the first database does not comprise the at least one test: (i) determining that a previously executed job identified in a second database comprises the at least one test, (ii) updating one or more configuration parameters of the previously executed job based at least in part on the at least one affected portion of software code to create a new job, (iii) adding the new job to the first database, and (iv) executing the new job.

The identifying may be based at least in part on one or more of: respective priorities and respective execution times of a plurality of tests affected by the commit operation. The identifying may include identifying a change to at least one function of the software code of the code repository. The change may include a change to one or more parameters of the at least one function. The updating the one or more configuration parameters of one or more of the at least one existing job and the previously executed job may be based on the change. The second database may include results of a plurality of previously executed jobs. The techniques depicted in FIG. 3 may include determining that the executing of the new job failed; and blocking the commit operation. Also, the techniques may include generating a notification in response to determining that the second database does not comprise the at least one test. Additionally, the techniques may include obtaining and executing one or more test scripts corresponding to the affected one or more portions of software code.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the efficiency of creating and managing tests for checking software code. These and other embodiments can effectively overcome problems associated with existing testing techniques that require individual developers to create specific unit tests according to their respective code changes. For example, some embodiments are configured to identify areas of code across a code repository that are affected by a commit and efficiently create tests for these areas of code. These and other embodiments can effectively reduce down-time, increase system efficiency, and decrease software release times relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
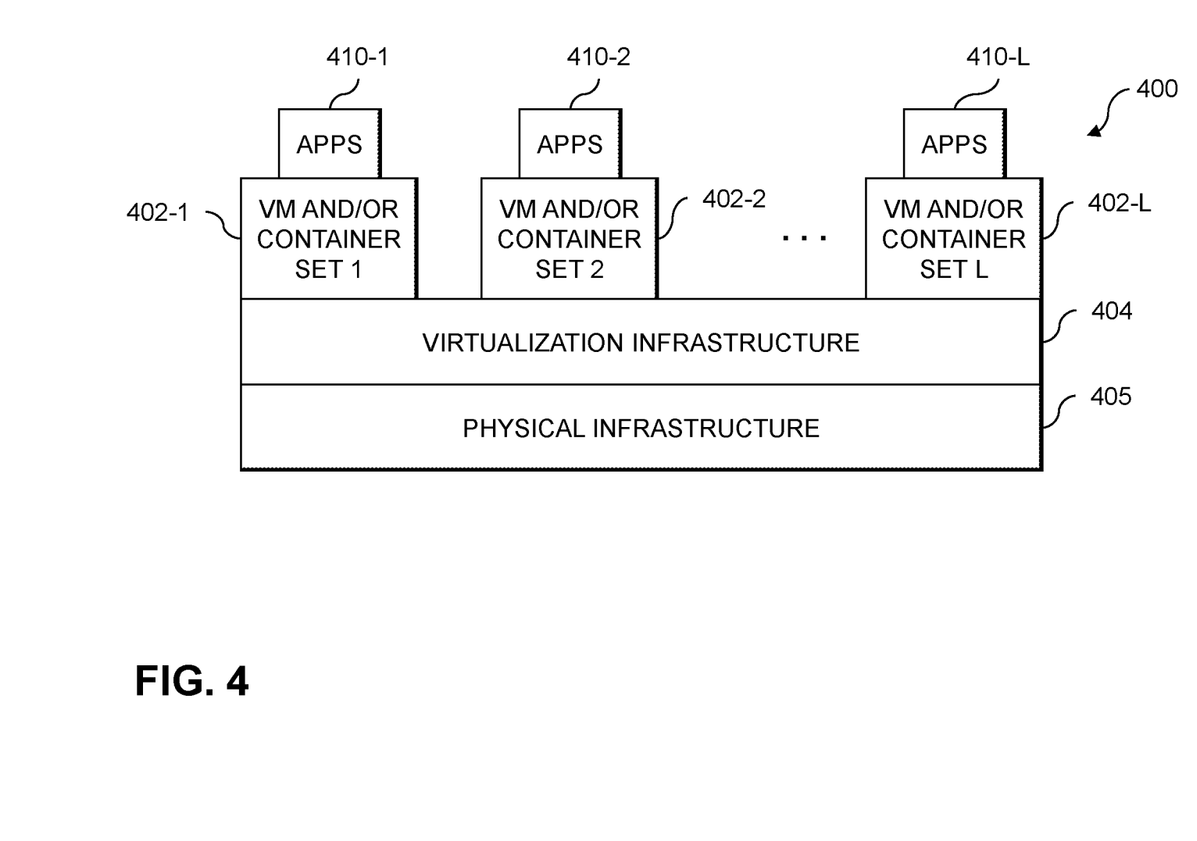
FIGS. 4 and 5 show examples of processing platforms that may be utilized to implement at least a portion of an information processing system in illustrative embodiments.
Figure 5:
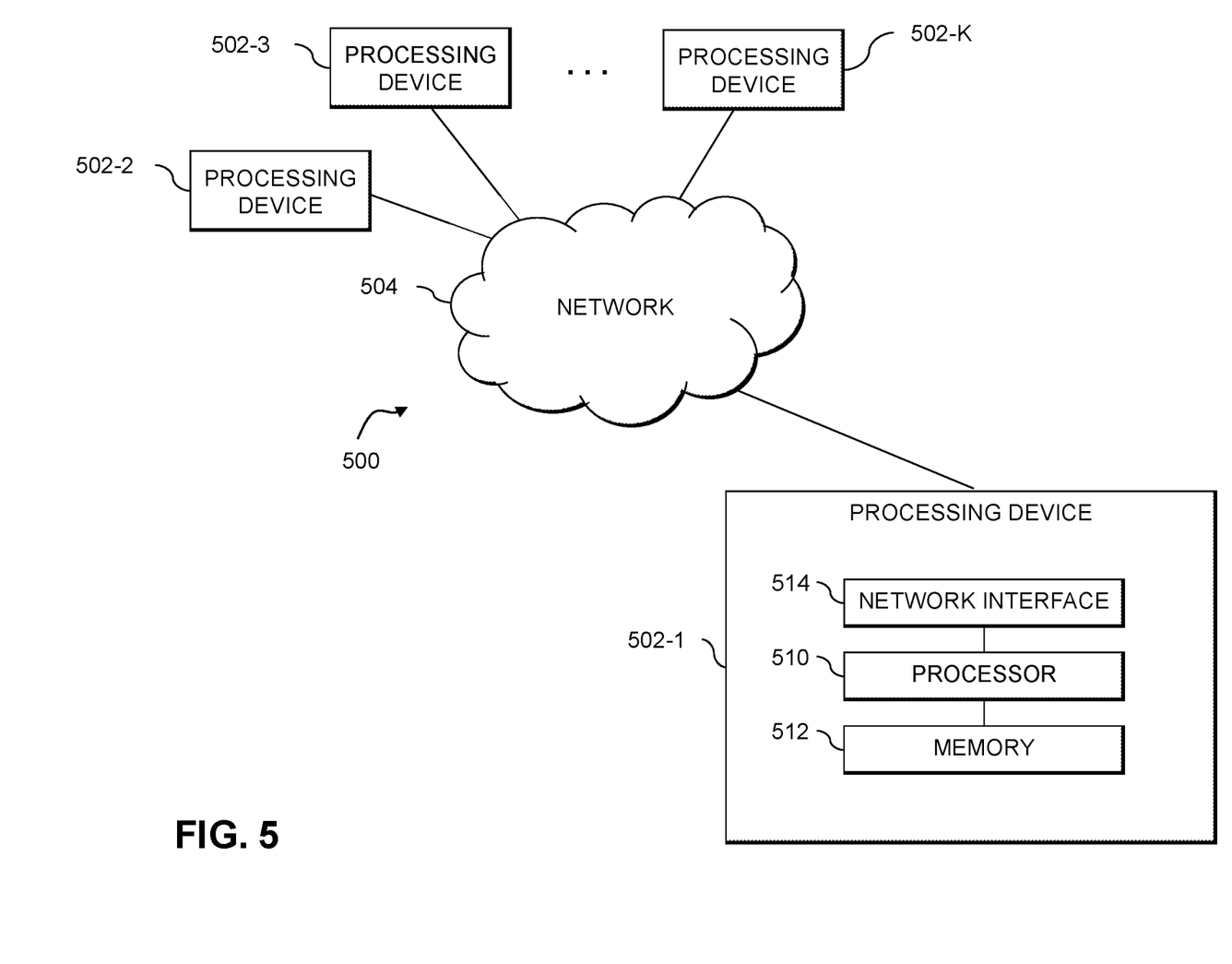

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a microcontroller, an application-specific integrated circuit (ASIC), a field-programmable gate array (FPGA) or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining at least one portion of software code in a code repository that is affected by a commit operation involving one or more changes, wherein the one or more changes comprise at least one change corresponding to at least one function parameter of at least one other portion of the software code;
    identifying at least one test from a plurality of tests that is related to the at least one affected portion of software code, wherein the identifying comprises: ranking the plurality of tests based on at least one of: estimated execution times corresponding to one or more of the plurality of tests and priority levels assigned to one or more of the plurality of tests; and identifying a portion of the plurality of tests as the at least one test based on the ranking;
    determining whether at least one existing job identified in a first database comprises the at least one test;
    in response to determining that the at least one existing job identified in the first database comprises the at least one test: (i) updating one or more configuration parameters of the at least one existing job based at least in part on the at least one affected portion of software code, and (ii) executing the at least one existing job with the updated one or more configuration parameters; and
    in response to determining that the at least one existing job identified in the first database does not comprise the at least one test: (i) determining that a previously executed job identified in a second database comprises the at least one test, (ii) updating one or more configuration parameters of the previously executed job based at least in part on the at least one affected portion of software code to create a new job, (iii) adding the new job to the first database, and (iv) executing the new job;
    wherein the method is performed by at least one processing device comprising a processor coupled to a memory.

2. The computer-implemented method of claim 1, wherein the plurality of tests comprises a set of tests corresponding to a given feature, and wherein the portion of the plurality of tests comprises a subset of the set of tests.

3. The computer-implemented method of claim 1, wherein the one or more changes comprise at least one change to at least one function of the at least one other portion of the software code of the code repository.

4. The computer-implemented method of claim 3, wherein the updating the one or more configuration parameters of one or more of the at least one existing job and the previously executed job is based on at least a portion of the one or more changes.

5. The computer-implemented method of claim 1, comprising:
determining that the executing of at least one of the at least one existing job and the new job failed; and
blocking the commit operation.

6. The computer-implemented method of claim 1, comprising:
generating a notification in response to determining that the second database does not comprise at least one test.

7. The computer-implemented method of claim 1, wherein the second database comprises results of a plurality of previously executed jobs.

8. The computer-implemented method of claim 1, further comprising:
obtaining and executing one or more test scripts corresponding to the affected at least one portion of software code.

9. A non-transitory processor-readable storage medium having stored therein program code of one or more software programs, wherein the program code when executed by at least one processing device causes the at least one processing device:
to determine at least one portion of software code in a code repository that is affected by a commit operation involving one or more changes, wherein the one or more changes comprise at least one change corresponding to at least one function parameter of at least one other portion of the software code;
to identify at least one test from a plurality of tests that is related to the at least one affected portion of software code, wherein the identifying comprises: ranking the plurality of tests based on at least one of: estimated execution times corresponding to one or more of the plurality of tests and priority levels assigned to one or more of the plurality of tests; and identifying a portion of the plurality of tests as the at least one test based on the ranking;
to determine whether at least one existing job identified in a first database comprises the at least one test;
in response to determination that the at least one existing job identified in the first database comprises the at least one test: (i) to update one or more configuration parameters of the at least one existing job based at least in part on the at least one affected portion of software code, and (ii) to execute the at least one existing job with the updated one or more configuration parameters; and
in response to determination that the at least one existing job identified in the first database does not comprise the at least one test: (i) to determine that a previously executed job identified in a second database comprises the at least one test, (ii) to update one or more configuration parameters of the previously executed job based at least in part on the at least one affected portion of software code to create a new job, (iii) to add the new job to the first database, and (iv) to execute the new job.

10. The non-transitory processor-readable storage medium of claim 9, wherein the plurality of tests comprises a set of tests corresponding to a given feature, and wherein the portion of the plurality of tests comprises a subset of the set of tests.

11. The non-transitory processor-readable storage medium of claim 9, wherein the one or more changes comprise at least one change to at least one function of the at least one other portion of the software code of the code repository.

12. The non-transitory processor-readable storage medium of claim 11, wherein the updating the one or more configuration parameters of one or more of the at least one existing job and the previously executed job is based on at least a portion of the one or more changes.

13. The non-transitory processor-readable storage medium of claim 9, wherein the program code when executed by the at least one processing device causes the at least one processing device:
to determine that the executing of at least one of the at least one existing job and the new job failed; and
to block the commit operation.

14. The non-transitory processor-readable storage medium of claim 9, wherein the program code when executed by the at least one processing device causes the at least one processing device:
to generate a notification in response to determining the second database does not comprise at least one test.

15. An apparatus comprising:
at least one processing device comprising a processor coupled to a memory;
the at least one processing device being configured:
to determine at least one portion of software code in a code repository that is affected by a commit operation involving one or more changes, wherein the one or more changes comprise at least one change corresponding to at least one function parameter of at least one other portion of the software code;
to identify at least one test from a plurality of tests that is related to the at least one affected portion of software code, wherein the identifying comprises: ranking the plurality of tests based on at least one of: estimated execution times corresponding to one or more of the plurality of tests and priority levels assigned to one or more of the plurality of tests; and identifying a portion of the plurality of tests as the at least one test based on the ranking;
to determine whether at least one existing job identified in a first database comprises the at least one test;
in response to determination that the at least one existing job identified in the first database comprises the at least one test: (i) to update one or more configuration parameters of the at least one existing job based at least in part on the at least one affected portion of software code, and (ii) to execute the at least one existing job with the updated one or more configuration parameters; and
in response to determination that the at least one existing job identified in the first database does not comprise the at least one test: (i) to determine that a previously executed job identified in a second database comprises the at least one test, (ii) to update one or more configuration parameters of the previously executed job based at least in part on the at least one affected portion of software code to create a new job, (iii) to add the new job to the first database, and (iv) to execute the new job.

16. The apparatus of claim 15, wherein the plurality of tests comprises a set of tests corresponding to a given feature, and wherein the portion of the plurality of tests comprises a subset of the set of tests.

17. The apparatus of claim 15, wherein the at least one processing device is configured:
   to determine that the executing of at least one of the at least one existing job and the new job failed; and
   to block the commit operation.

18. The apparatus of claim 15, wherein the one or more changes comprise at least one change to at least one function of the at least one other portion of the software code of the code repository.

19. The apparatus of claim 18, wherein the updating the one or more configuration parameters of one or more of the at least one existing job and the previously executed job is based on at least a portion of the one or more changes.

20. The apparatus of claim 18, wherein the second database comprises results of a plurality of previously executed jobs.

* * * * *